United States Patent
Abramoski et al.

(10) Patent No.: US 6,224,133 B1
(45) Date of Patent: May 1, 2001

(54) SECONDARY FLOOR ASSEMBLY

(75) Inventors: Edward J. Abramoski, Canton, MI (US); Karl M. Siebertz, Cologne (DE); James R. Feustel, Ann Arbor; Brian R. Spahn, Plymouth, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/186,232

(22) Filed: Nov. 4, 1998

(51) Int. Cl.⁷ .................................................. B60N 3/06
(52) U.S. Cl. ................................................................ 296/75
(58) Field of Search ................................ 296/97.23, 193, 296/75, 191, 204, 188, 189, 203.02, 30, 194, 187

(56) References Cited

U.S. PATENT DOCUMENTS

| | | |
|---|---|---|
| 3,047,088 * | 7/1962 | Murrell ............................. 180/90.6 |
| 3,423,122 * | 1/1969 | Wessells, III ..................... 296/186 X |
| 3,806,184 | 4/1974 | Dean . |
| 3,860,284 | 1/1975 | Lichtig . |
| 3,904,237 | 9/1975 | Barenyi et al. . |
| 4,726,438 * | 2/1988 | Stuertz et al. ..................... 180/90.6 |
| 5,127,704 | 7/1992 | Komatsu . |
| 5,697,667 * | 12/1997 | Beaudet et al. ................... 296/189 |
| 5,882,037 * | 3/1999 | Bauer et al. ..................... 296/191 X |
| 6,102,466 * | 8/2000 | Kanazawa et al. ................ 296/75 |

FOREIGN PATENT DOCUMENTS 2179898   3/1987 (GB) .

* cited by examiner

Primary Examiner—D. Glenn Dayoan
Assistant Examiner—Jason Morrow
(74) Attorney, Agent, or Firm—David B. Kelley

(57) ABSTRACT

A secondary floor assembly for a motor vehicle having a floorpan extending generally horizontally and a toeboard extending generally upwardly at an angle from the floorpan includes a heel portion extending laterally and longitudinally along the floorpan and a toe portion connected to the heel portion and extending laterally and upwardly along the toeboard for pushing a heel of a foot of an occupant of the motor vehicle rearwardly during a frontal impact of the motor vehicle.

11 Claims, 2 Drawing Sheets

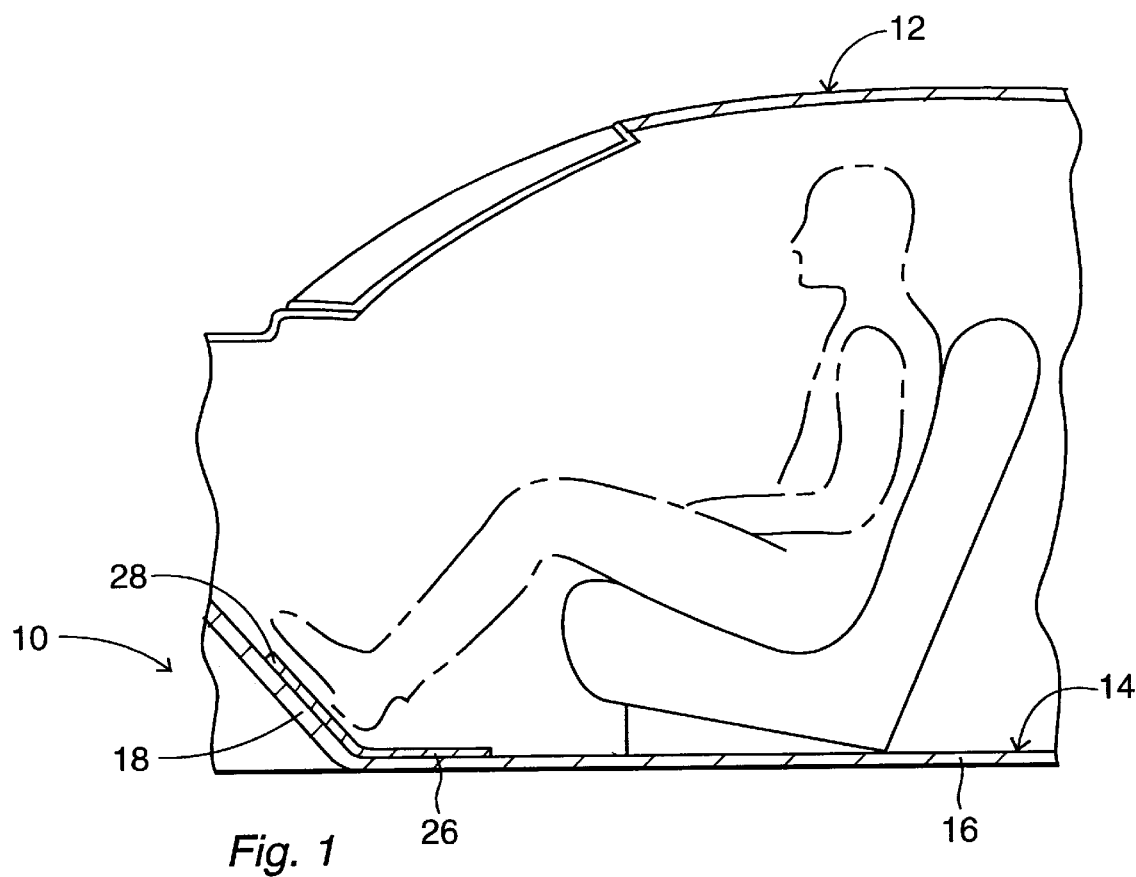
Fig. 1
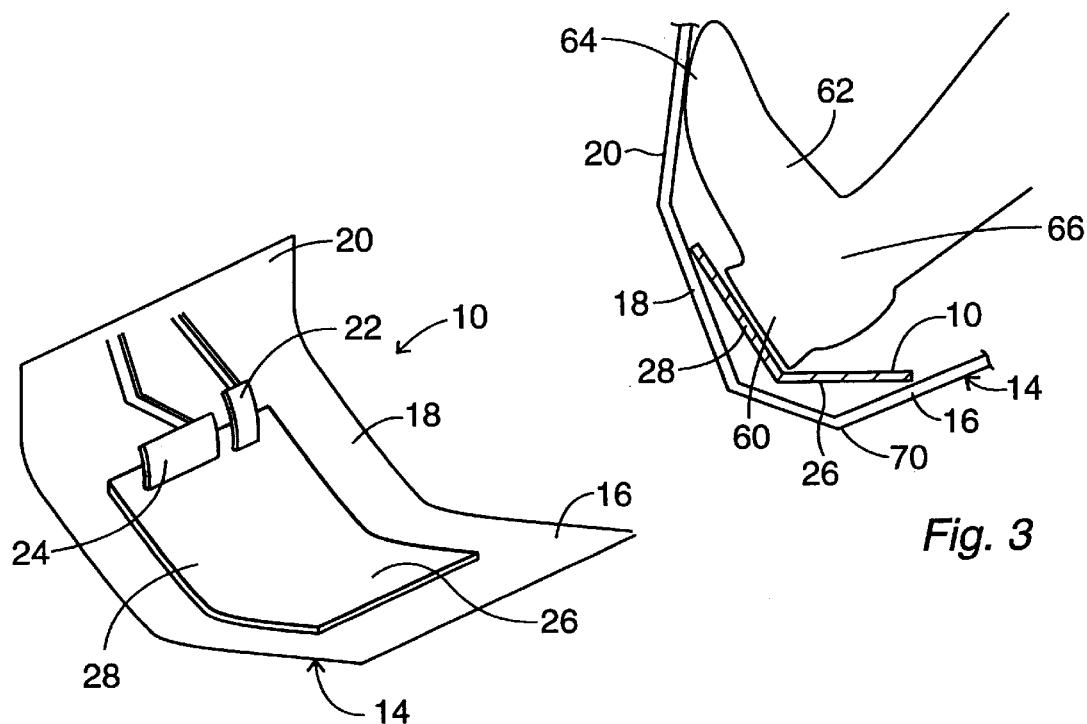
Fig. 2
Fig. 3

SECONDARY FLOOR ASSEMBLY

BACKGROUND OF THE INVENTION

1. Field of the Invention

The present invention relates generally to floors for vehicles and, more specifically, to a secondary floor assembly for a motor vehicle.

2. Description of the Related Art

It is known to provide a structural floor assembly for a body of a motor vehicle. Typically, the structural floor assembly includes a floorpan extending generally horizontally and a toeboard extending upwardly at an angle from the floorpan. The structural floor assembly also includes a dash extending generally vertically upwardly from the toeboard. Commonly, one or more pedals, such as an accelerator and brake pedal, extend from the body and generally parallel to the toeboard. Generally, the structural floor assembly is covered by carpeting.

It is known to provide a structural floor assembly with an energy absorbing material that absorbs energy during a frontal impact of the motor vehicle. The energy absorbing material covers the entire toeboard laterally and is made to absorb energy.

Although the above structural floor assembly has worked well, it suffers from the disadvantage that the energy absorbing material only resists axial loads and offers limited benefits for bending moments for an ankle of an occupant during a frontal impact of the motor vehicle. As a result, the rearward movement of the structural floor assembly may push a ball of the foot which would rotate the foot relative to a tibia, resulting in potential injury to an ankle of the occupant. Another disadvantage of the structural floor assembly is that any local deformations of the toeboard and/or floorpan could potentially result in entrapment of a heel of the foot, thereby increasing forces and moments on the foot and ankle, resulting in potential injury.

SUMMARY OF THE INVENTION

Accordingly, the present invention is a secondary floor assembly for a motor vehicle including a floorpan extending generally horizontally and a toeboard extending generally upwardly at an angle from the floorpan. The secondary floor assembly includes a heel portion extending laterally and longitudinally along the floorpan and a toe portion connected to the heel portion and extending laterally and upwardly along the toeboard for pushing a heel of a foot of an occupant of the motor vehicle rearwardly during a frontal impact of the motor vehicle.

One advantage of the present invention is that a secondary floor assembly is provided for a motor vehicle. Another advantage of the present invention is that the secondary floor assembly is mounted on top of a structural floor assembly to reduce lower leg injury by reducing ankle rotation and inhibiting foot entrapment. Yet another advantage of the present invention is that the secondary floor assembly reduces the likelihood of foot and ankle injury during a frontal impact of the motor vehicle.

Other features and advantages of the present invention will be readily appreciated as the same becomes better understood after reading the subsequent description when taken in conjunction with the accompanying drawings.

BRIEF DESCRIPTION OF THE DRAWINGS

FIG. 1 is a fragmentary elevational view of a secondary floor assembly, according to the present invention, illustrated in operational relationship with a motor vehicle.

FIG. 2 is a perspective view of the secondary floor assembly of FIG. 1.

FIG. 3 is an elevational view of the secondary floor assembly of FIG. 2 after a frontal impact on the motor vehicle.

DESCRIPTION OF THE PREFERRED EMBODIMENT(S)

Figure 4:
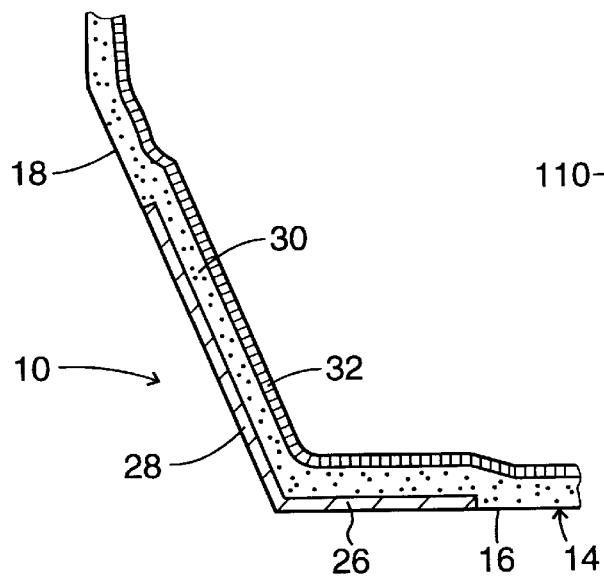
FIG. 4 is a fragmentary elevational view of the secondary floor assembly of FIG. 1.

Referring now to the drawings and in particular FIGS. 1 and 2, one embodiment of a secondary floor assembly 10, according to the present invention, is shown for a motor vehicle, generally indicated at 12. The secondary floor assembly 10 is adapted to mount on top of a structural floor assembly, generally indicated at 14, of the motor vehicle 12. The structural floor assembly 14 includes a floorpan 16 extending laterally and longitudinally and is orientated generally horizontally. The structural floor assembly 14 also includes a toeboard 18 extending laterally and upwardly at an angle from the floorpan 16. The structural floor assembly 14 may also include a dash 20 extending laterally and upwardly from the toeboard 18 and is orientated generally vertically. The floorpan 16, toeboard 18 and dash 20 are made of a relatively rigid material such as metal. It should be appreciated that the floorpan 16, toeboard 18 and dash 20 may be integral, unitary and formed as one-piece. It should also be appreciated that the structural floor assembly 14 is conventional and known in the art.

The motor vehicle 12 may also include an accelerator pedal 22 and a brake pedal 24. The accelerator pedal 22 and brake pedal 24 are orientated generally parallel to the toeboard 28 and are connected to vehicle structure as is known in the art. It should be appreciated that the accelerator pedal 22 and brake pedal 24 are conventional and known in the art.

The secondary floor assembly 10, according to the present invention, includes a heel portion 26 extending laterally and longitudinally over a localized area of the floorpan 16. In the embodiment illustrated in FIG. 1, the heel portion 26 extends laterally a distance slightly greater than a projected floor contact area where one or both feet of an occupant rests on the structural floor assembly 14. In the embodiment illustrated in FIG. 2, the heel portion 26 extends laterally a distance slightly greater than a distance of the accelerator pedal 22 and brake pedal 24. In either embodiment, the heel portion 26 extends rearwardly a distance to cover the entire foot or just the heel of the foot of the occupant.

The secondary floor assembly 10 includes a toe portion 28 extending laterally and longitudinally over a localized area of the toeboard 18. Preferably, the toe portion 28 extends laterally the same distance as the heel portion 26. In the embodiment of FIG. 1, the toe portion 28 extends upwardly a distance slightly greater than a distance of the entire foot of the occupant. In the embodiment of FIG. 2, the toe portion 28 extends upwardly a distance slightly greater than the location of the accelerator pedal 22 and brake pedal 24.

The heel portion 26 and toe portion 28 are made from either a rigid or semi-rigid material such as metal, plastic or a high density foam/metal composite. Preferably, the heel portion 26 and toe portion 28 are integral, unitary and formed as one-piece.

Referring to FIG. 4, the secondary floor assembly 10 may be attached to the structural floor assembly 14 by suitable means such as clips, rivets or an adhesive (not shown) . In the embodiment illustrated, the secondary floor assembly 10 may be include a first layer 30 of foam or sound absorbing material and a second layer 32 of carpeting covering the first layer 30. It should be appreciated that any attachments to the structural floor assembly 14 would have to be separate or become disconnected so that the secondary floor assembly 10 will maintain substantially its original shape.

Figure 5:
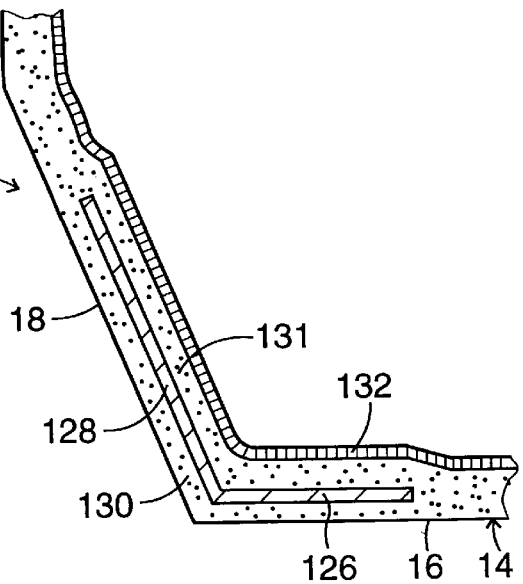
FIG. 5 is a fragmentary elevational view of another embodiment, according to the present invention, of the secondary floor assembly of FIG. 1.

Referring to FIG. 5, another embodiment 110, according to the present invention, of the secondary floor assembly 10 is shown. Like parts of the secondary floor assembly 10 have like numerals increased by one hundred (100). In this embodiment, the secondary floor assembly 110 may include a first layer 130 of foam or sound absorbing material disposed between the structural floor assembly 14 and the toe portion 128 and heel portion 126. The secondary floor assembly 10 may include another layer 131 of foam or sound absorbing material covering the toe portion 128 and heel portion 126. The secondary floor assembly 10 may include a third layer 132 of carpeting covering the second layer 131. It should be appreciated that the toe portion 128 and heel portion 126 could be embedded in a single piece of foam or sound absorbing material. It should also be appreciated that the toe portion 128 and heel portion 126 is a loose piece between the structural floor assembly 14 and the layer 132 of carpeting.

Figure 6:
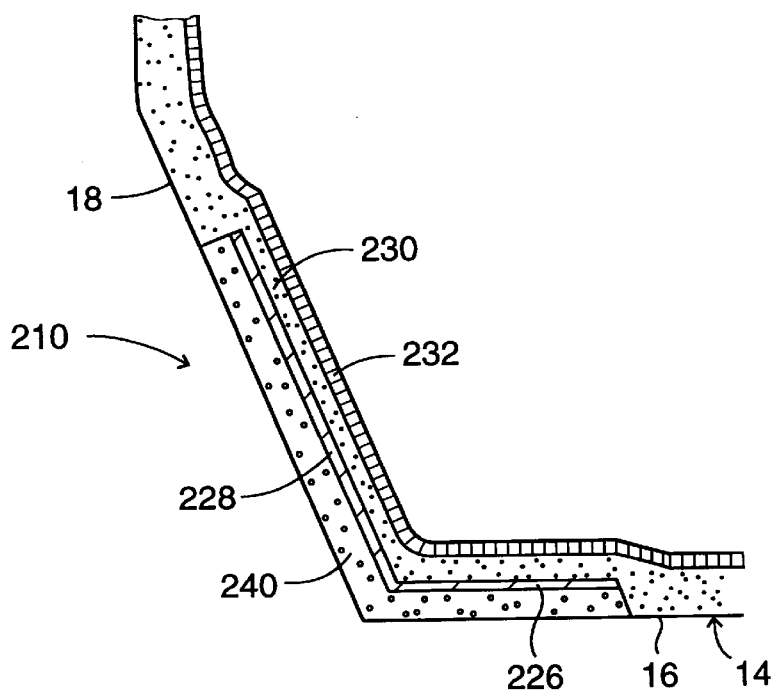
FIG. 6 is a fragmentary elevational view of yet another embodiment, according to the present invention, of the secondary floor assembly of FIG. 1.

Referring to FIG. 6, yet another embodiment 210, according to the present invention, of the secondary floor assembly 10 is shown. Like parts of the secondary floor assembly 10 have like reference numerals increased by two hundred (200). In this embodiment, the secondary floor assembly 210 may include a support member 240 disposed between the structural floor assembly 14 and the toe portion 228 and heel portion 226. The support member 240 is made of a foam material such as a high density foam and has the same dimensions as the heel portion 226 and toe portion 228. The secondary floor assembly 10 may include a first layer 230 of foam or sound absorbing material covering the heel portion 226 and toe portion 228. The secondary floor assembly 210 may also include a second layer 232 of carpeting covering the first layer 230. Preferably, the heel portion 226 and toe portion 228 are made of a metal material. Alternatively, the support member 240 may also include a layer (not shown) of metal on the top and bottom thereof. It should be appreciated that the heel portion 226 and toe portion 228 are secured to the support member 240 by suitable means such as an adhesive.

In operation of the secondary floor assembly 10 as illustrated in FIG. 3, when the motor vehicle 12 receives a frontal impact from an object with sufficient force, the secondary floor assembly 10 slides or rotates rearward as a unit, maintaining its shape when acted on by dash intrusion, resulting from a severe frontal impact. This rearward movement will push a heel 60 of a foot 62 of the occupant rearward during rotation of the toeboard 18 as opposed to pushing a ball 64 of the foot 62 which would rotate the foot 62 relative to a tibia (not shown), resulting in potential injury to an ankle 66 of the occupant. Further, the frontal impact on the motor vehicle 12 may cause the floorpan 16 of the structural floor assembly 14 to buckle at 70. The rearward movement of the secondary floor assembly 10 helps to protect the foot 62 of the occupant from possible entrapment caused by the buckling or local deformation of the toeboard 18 and/or floorpan 16. It should be appreciated that the secondary floor assembly 110 and 210 operate in a similar manner.

Accordingly, the secondary floor assembly 10 functions to reduce lower leg injury by reducing ankle rotation and inhibiting foot entrapment. The secondary floor assembly 10, 110, 210 reduces tibia moments up to approximately eighty percent, resulting in a sixty percent reduction in a lower tibia index calculation.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A secondary floor assembly for a motor vehicle including a floorpan extending generally horizontally and a toeboard extending generally upwardly at an angle from the floorpan, said secondary floor assembly comprising:

a heel portion extending laterally and longitudinally over and along the floorpan;

a toe portion connected to said heel portion and extending laterally and upwardly over and along the toeboard for pushing a heel of a foot of an occupant of the motor vehicle rearwardly during a frontal impact of the motor vehicle; and wherein said heel portion and said toe portion are made of a foam/metal composite.

2. A secondary floor assembly for a motor vehicle including a floorpan extending generally horizontally and a toeboard extending generally upwardly at an angle from the floorpan, said secondary floor assembly comprising:

a heel portion extending laterally and longitudinally over and along the floorpan;

a toe portion connected to said heel portion and extending laterally and upwardly over and along the toeboard for pushing a heel of a foot of an occupant of the motor vehicle rearwardly during a frontal impact of the motor vehicle; and a layer of sound absorbing material disposed over said heel portion and said toe portion.

3. A secondary floor assembly as set forth in claim 2 including a layer of carpeting disposed over said layer of sound absorbing material.

4. A secondary floor assembly as set forth in claim 3 including a second layer of sound absorbing material disposed between said heel portion and said toe portion and said layer of carpeting.

5. A secondary floor assembly as set forth in claim 1 including a support member disposed between said heel portion and said toe portion and the floorpan and the toeboard.

6. A secondary floor assembly for a motor vehicle including a floorpan extending generally horizontally and a toeboard extending generally upwardly at an angle from the floorpan, said secondary floor assembly comprising:

a heel portion extending laterally and longitudinally over and along the floorpan;

a toe portion connected to said heel portion and extending laterally and upwardly over and along the toeboard for pushing a heel of a foot of an occupant of the motor vehicle rearwardly during a frontal impact of the motor vehicle;

a support member disposed between said heel portion and said toe portion and the floorpan and the toeboard; and wherein said support member is made of a foam material.

7. A secondary floor assembly as set forth in claim 1 wherein said heel portion and said toe portion extend laterally a distance greater than a foot of an occupant of the motor vehicle.

8. A secondary floor assembly as set forth in claim 1 wherein said heel portion extends longitudinally a distance greater than a heel of an occupant of the motor vehicle.

9. A floor assembly for a motor vehicle comprising:

a structural floor assembly, said structural floor assembly including a floorpan extending generally horizontally and a toeboard extending generally upwardly at an angle from said floorpan; and a secondary floor assembly disposed on top of said structural floor assembly in a projected floor contact area of an occupant of the motor vehicle for pushing a heel of a foot of an occupant of the motor vehicle rearwardly during a frontal impact of the motor vehicle, said secondary floor assembly comprising a heel portion extending laterally and longitudinally over and along a portion of said floorpan and a toe portion connected to said heel portion and extending laterally and upwardly over and along a portion of said toeboard;

wherein said secondary floor assembly is made of a metal/foam composite material.

10. A floor assembly for a motor vehicle comprising:

a structural floor assembly, said structural floor assembly including a floorpan extending generally horizontally and a toeboard extending generally upwardly at an angle from said floorpan;

a secondary floor assembly disposed on top of said structural floor assembly in a projected floor contact area of an occupant of the motor vehicle for pushing a heel of a foot of an occupant of the motor vehicle rearwardly during a frontal impact of the motor vehicle, said secondary floor assembly comprising a heel portion extending laterally and longitudinally over and along a portion of said floorpan and a toe portion connected to said heel portion and extending laterally and upwardly over and along a portion of said toeboard; and wherein said secondary floor assembly includes a layer of sound absorbing material disposed over said heel portion and said toe portion and a layer of carpeting disposed over said layer of sound absorbing material.

11. A floor assembly as set forth in claim 10 including a support member disposed between said structural floor assembly and said secondary floor assembly.

* * * * *